US010241901B2

(12) United States Patent
Pho et al.

(10) Patent No.: US 10,241,901 B2
(45) Date of Patent: Mar. 26, 2019

(54) WEB APPLICATION PERFORMANCE TESTING

(71) Applicant: Oracle International Corporation, Redwood Shores, CA (US)

(72) Inventors: Van Pho, Draveil (FR); David A. Phipps, San Rafael, CA (US); Shaun Lin, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/730,692

(22) Filed: Jun. 4, 2015

(65) Prior Publication Data
US 2016/0098341 A1    Apr. 7, 2016

Related U.S. Application Data

(60) Provisional application No. 62/060,107, filed on Oct. 6, 2014.

(51) Int. Cl.
*G06F 11/36*    (2006.01)
*G06F 11/32*    (2006.01)
(Continued)

(52) U.S. Cl.
CPC ........ *G06F 11/3688* (2013.01); *G06F 11/323* (2013.01); *G06F 11/3409* (2013.01); *G06F 11/3466* (2013.01); *G06F 11/26* (2013.01); *G06F 11/3612* (2013.01); *G06F 11/3636* (2013.01); *G06F 11/3664* (2013.01); *G06F 11/3672* (2013.01); *G06F 2201/865* (2013.01);
(Continued)

(58) Field of Classification Search
CPC .. G06F 11/34; G06F 11/3612; G06F 11/3636; G06F 11/3664; G06F 8/36; G06F 8/70; G06F 11/26; G06F 11/323; G06F 11/3409; G06F 11/3466; G06F 11/3672; G06F 11/3688; G06F 2201/865; G06F 2201/875; H04L 67/1004
USPC .......................................... 717/133
See application file for complete search history.

(56) References Cited

U.S. PATENT DOCUMENTS 8,464,219 B1 *   6/2013   Wilkerson .......... G06F 11/3664
                                                           717/120
8,650,493 B2    2/2014   Miller
(Continued)

OTHER PUBLICATIONS

EJ Technologies; JProfiler Manual; © 2015 ej-techonologies GmbH.
(Continued)

*Primary Examiner* — Wei Y Zhen
*Assistant Examiner* — Mohammed N Huda
(74) *Attorney, Agent, or Firm* — Potomac Law Group, PLLC

(57) ABSTRACT

A system for performance testing a web application initializes to be instrumented a subset of methods of the web application to be tested in response to a request, and then tests the application based on the subset of methods. The system generates an instrumented call tree and corresponding stack traces for each request in response to the testing, and determines one or more methods that take longer than a predetermined time period to execute using the instrumented call trees and the stack traces. The system then determines additional methods to be tested and adds the determined additional methods to the subset of methods and repeats the testing.

20 Claims, 15 Drawing Sheets

(51) Int. Cl.
 *G06F 11/34* (2006.01)
 *H04L 29/08* (2006.01)
 *G06F 11/26* (2006.01)
(52) U.S. Cl.
 CPC .... *G06F 2201/875* (2013.01); *H04L 67/1004* (2013.01)

(56) References Cited

U.S. PATENT DOCUMENTS

| | | | |
|---|---|---|---|
| 9,021,448 B1* | 4/2015 | Gagliardi et al. | G06F 8/70 717/128 |
| 2006/0217930 A1 | 9/2006 | Chang et al. | |
| 2012/0222014 A1* | 8/2012 | Peretz et al. | G06F 11/3688 717/125 |
| 2014/0280182 A1 | 9/2014 | Anderson | |

OTHER PUBLICATIONS http://en.wikipedia.org/w/index.php?title=Web_testing&printable=yes; downloaded on Mar. 28, 2015.
https://www.ej-technologies.com/products/jprofiler/overview.html; downloaded on Mar. 26, 2015.
K. Srinivasan; "Introduction to Java Agents"; Jun. 16, 2012; http://www.javabeat.net/introduction-to-java-agents/.
Oracle Data Sheet; "Oracle WebLogic Server"; © 2014 Oracle and/or its affiliates.

* cited by examiner

================================
STACK TRACES (200)
================================

We will not display all the two hundred stack traces in this document, but just two.

<Stack trace 1> 12:21:05.743 - 12:21:11.412 (5669) - RUNNABLE java.net.SocketInputStream.socketRead0(Native Method)
java.net.SocketInputStream.read(SocketInputStream.java:140)
oracle.net.ns.Packet.receive(Packet.java:300)
oracle.net.ns.DataPacket.receive(DataPacket.java:106)
oracle.net.ns.NetInputStream.getNextPacket(NetInputStream.java:315)
oracle.net.ns.NetInputStream.read(NetInputStream.java:260)
oracle.net.ns.NetInputStream.read(NetInputStream.java:185)
......

Fig. 9

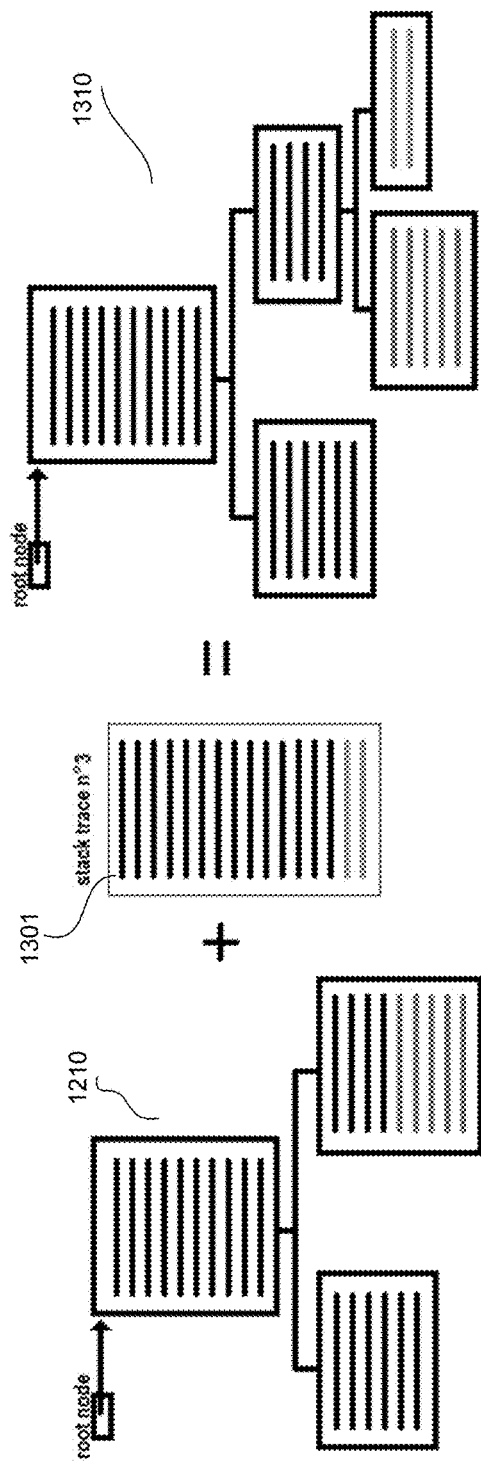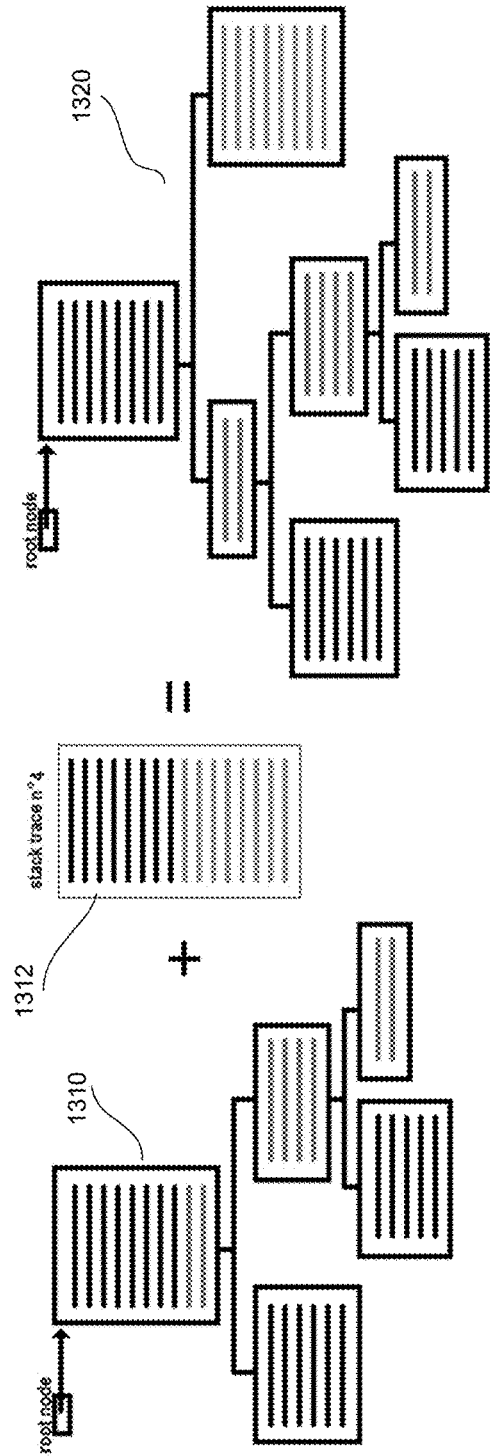

WEB APPLICATION PERFORMANCE TESTING

CROSS REFERENCE TO RELATED APPLICATIONS

This application claims priority of Provisional Patent Application Ser. No. 62/060,107, filed on Oct. 6, 2014, the contents of which is hereby incorporated by reference.

FIELD

One embodiment is directed generally to a computer system, and in particular to a computer system that performs performance testing of web applications.

BACKGROUND INFORMATION

Web applications are popular due to the ubiquity of web browsers, and the convenience of using a web browser as a client, sometimes referred to as "cloud computing." The ability to update and maintain web applications without distributing and installing software on potentially thousands of client computers is a key reason for their popularity, as is the inherent support for cross-platform compatibility. Common web applications include email, online retail sales, online auctions, accounting functions, etc.

A web application performance tool ("WAPT") is used to test web applications and web related interfaces. These tools are used for performance, load and stress testing of web applications, web sites, web servers and other web interfaces. A WAPT can simulate virtual users, which will repeatedly request either recorded uniform resource locators ("URLs") or a specified URL, and allows the users to specify the number of times or iterations that the virtual users will have to repeat the recorded URLs. By doing so, the tool is useful to check for bottleneck and performance leakage in the website or web application being tested.

SUMMARY

One embodiment is a system for performance testing a web application. The system initializes to be instrumented a subset of methods of the web application to be tested in response to a request, and then tests the application based on the subset of methods. The system generates an instrumented call tree and corresponding stack traces for each request in response to the testing, and determines one or more methods that take longer than a predetermined time period to execute using the instrumented call trees and the stack traces. The system then determines additional methods to be tested and adds the determined additional methods to the subset of methods and repeats the testing.

BRIEF DESCRIPTION OF THE DRAWINGS

FIG. 9 illustrates a generated stack trace output in response to performance testing in accordance with an embodiment of the invention.

FIGS. 12A, 12B, 13A and 13B illustrate the functionality to automatically determine the boundaries between two stack traces in accordance with embodiments of the invention.

DETAILED DESCRIPTION

Figure 1:
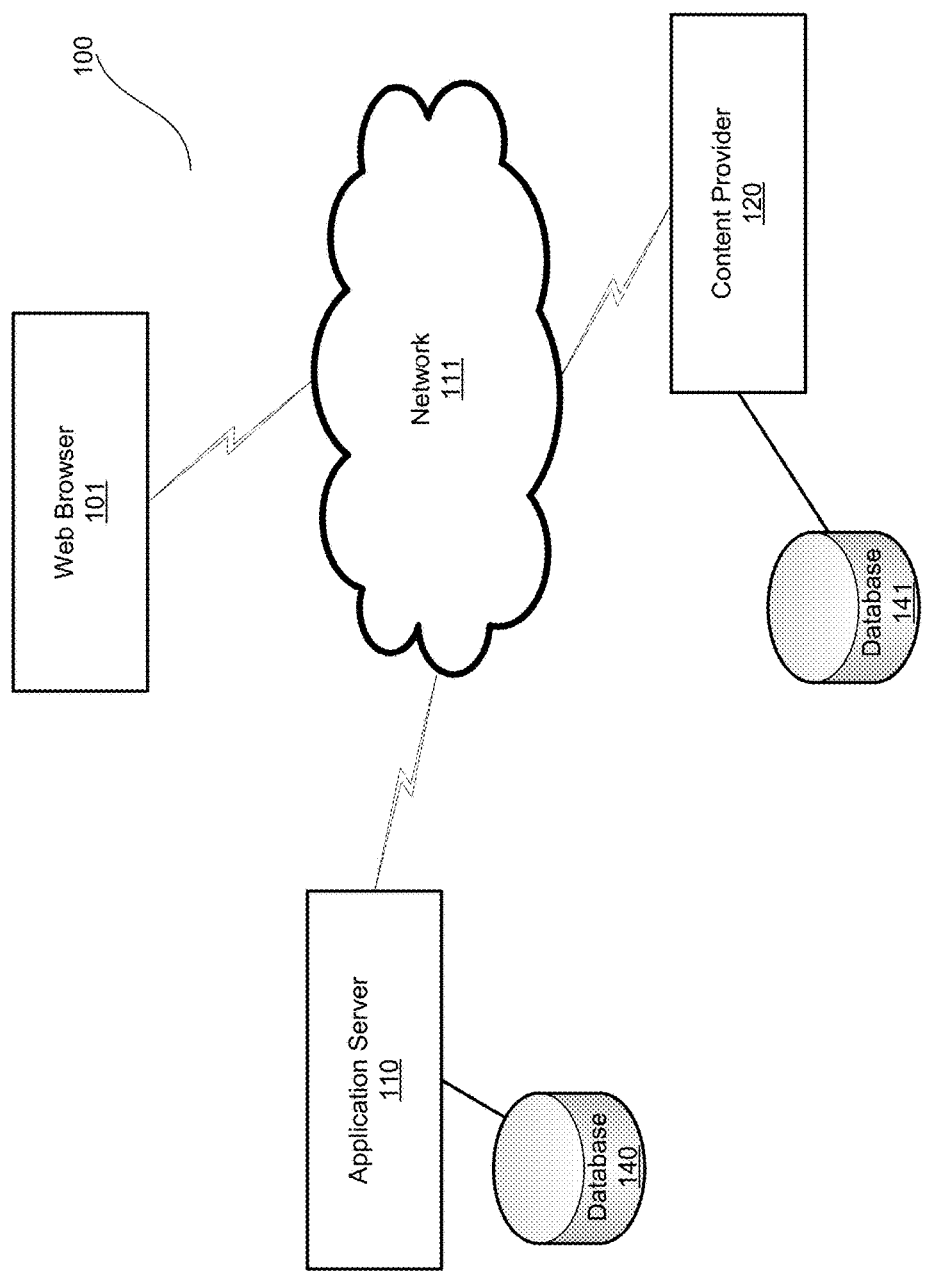
FIG. 1 is an overview diagram of a portal system including network elements that implement embodiments of the present invention and/or interact with embodiments of the present invention.

One embodiment is a performance diagnostic tool that measures the performance of a Java-based web application or web portal across multiple layers. Embodiments perform performance profiling, diagnosing and reporting. The multiple layers of the web application, including a web portal, that can be measured include the end user browser and devices, a web tier, a middleware tier, backend dependency components, and a database.

Embodiments allow a user to analyze realistic user clicks, then drill down into corresponding web requests. Embodiments further can pinpoint performance hotspots and bottlenecks in a Java virtual machine ("JVM") or callouts to backend services, such as a content server, a Lightweight Directory Access Protocol ("LDAP") server, a portlet server, a database server, etc. Embodiments can be dynamically configured to track any Java methods, capture their calling tree and calling stacks, and all exceptions within the calling stack, measure statistics on a per request basis, or aggregated over a period of time, all without restarting the web application server and with negligible overhead. Embodiments can be used on both a production system or in a development environment for debugging. Embodiments can be configured to show graphic performance trends at a high level and on an logical execution lifecycle level. As a result, embodiments strike a balance of light overhead with rich enough information for identifying performance issues, and without complexity and information overload.

One type of web application is used to generate portal web sites, or "web portals", and are increasingly being used to deliver complex and diverse content over a computer network. A web portal is a web site containing one or more portlets displayed on a web page. A portlet is a configurable content area displayable on a web page that provides content or performs one or more associated functions, or both. Portlets may display content that is obtained from a source remote from the web server. For example, a portal web site may use an arrangement of portlets to display web content on different subject areas. The web content for each of the subject areas need not be stored centrally to the web server, but instead may be stored in a plurality of locations geographically removed, but accessible to the portal web server. A portlet may be configured such that it may display the information it obtains to the web browser in a customized manner.

From an end user perspective, a portal is a web site with pages that are organized by tabs or some other form(s) of navigation. Each page can contain a nesting of sub-pages that are related hierarchically. Any page can contain multiple portlets, task flows, or other elements, giving users access to different information and tools in a single place. An administrator can modify a portal at runtime by, for example, adding new pages or changing the look and feel. If authorized through delegated administration, individual users can modify their view of a portal as well.

FIG. 1 is an overview diagram of a portal system 100 including network elements that implement embodiments of the present invention and/or interact with embodiments of the present invention. Portal system 100 includes a web browser 101, an application/web server 110, databases 140, 141, and a content provider 120.

A web browser 101 is any device capable of browsing content over a computer network 111, such as the Internet, and is operatively connected to application server 110. While only one web browser 101 is shown in FIG. 1, multiple web browsers 101 may be operatively connected to application server 110. Web browser 101 and application server 110 may communicate over computer network 111 using well-known communication protocols, such as Transmission Control Protocol ("TCP") and Internet Protocol ("IP"), or TCP/IP, HTTP and Extensible Markup Language ("XML").

In one embodiment, application server 110 is a well-known component that assembles and serves web pages to one or more web browsers 101. Application server 110 in one embodiment functions as an underneath middleware framework, and further includes applications such as Java 2 Platform, Enterprise Edition ("J2EE") applications. As such, application server 110 may serve web pages containing one or more portlets. A portlet is a configurable content area displayable on a web page that displays content obtained from a source remotely to the web server, or performs one or more functions remotely to the web server. A portlet may be configured such that it may display customized information to a user.

A content provider 120 is a functional component that provides content for a portlet in response to requests from application server 110. Content provider 120 in one embodiment is software operating on a separate hardware device other than that executing application server 110. In other embodiments, the functionality of content provider 120 and application server 110 can be implemented on the same network element. In some embodiments, content provider 120 may be implemented using a cross-platform component architecture such as the JavaBeans architecture. Such an embodiment is advantageous when deploying content providers 120 over multiple platforms.

Application server 110 assembles the requested web page using any content received from content provider 120 and data stored in an associated central repository concerning the organization and presentation of the web page. In one embodiment, the data stored in the central repository that application server 110 uses in assembling the requested web page includes data concerning the following attributes of the web page: style, layout, content resident thereon, portlets displayed thereon, items displayed thereon, groups, folders and user permissions for the web page. In other words, application server 110 manages data concerning the appearance and operation of portal web sites in a central repository, such as a database, and uses that information to assemble the web page, along with content received from content providers 120. The data application server 110 uses in rendering web pages may be directed towards visual aspects of the page (e.g., style or layout information), or it may be directed towards operational aspects of the page (e.g., what portlets are displayed, permissions regarding access to portions of the web page, etc.).

In embodiments of the invention, web pages are dynamically generated based upon data stored in tables in a database. In some embodiments, the content of the web page are stored in tables in a database, including databases 140, 141.

Figure 2:
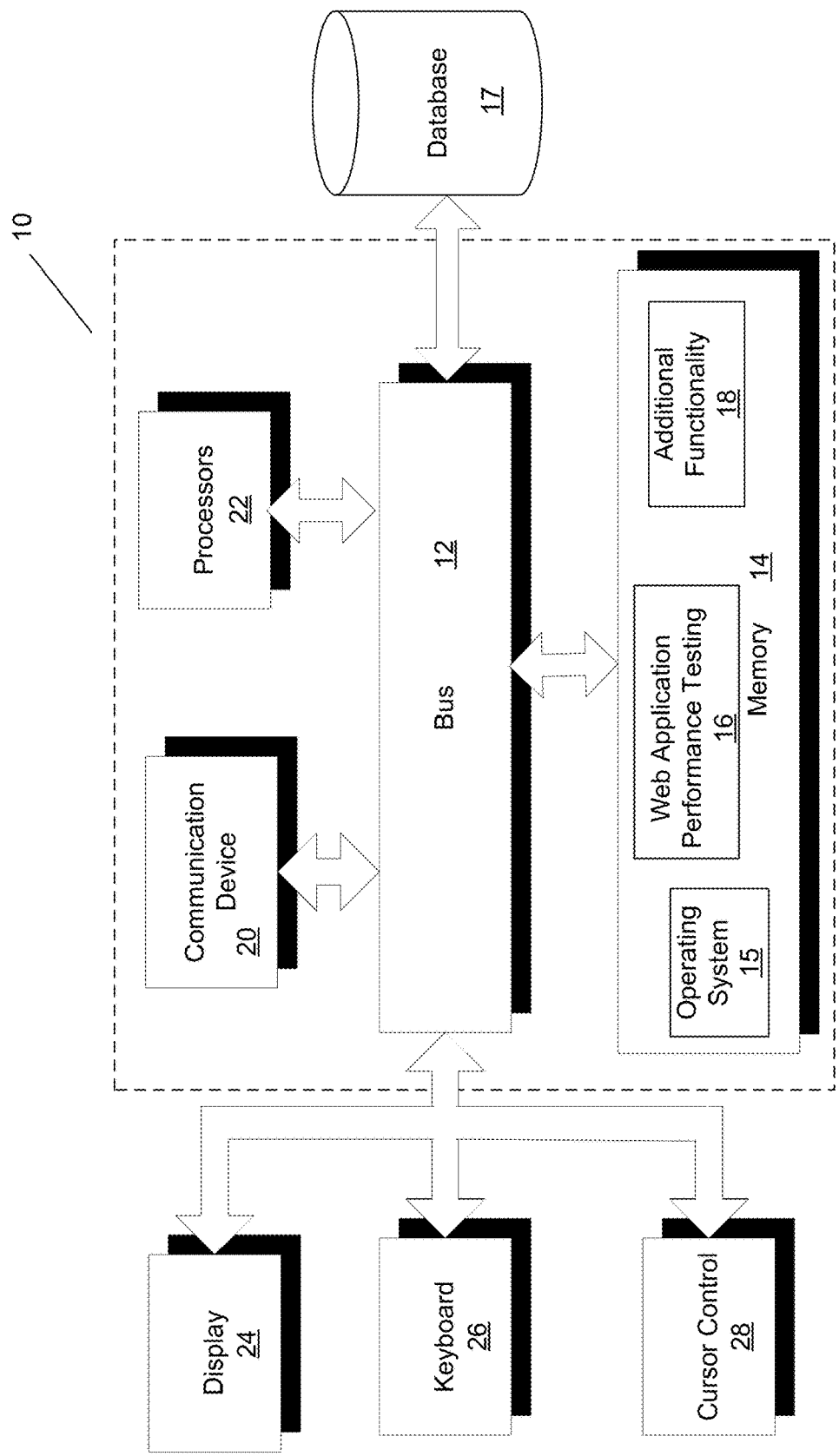
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of application server 110, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22.

The modules include an operating system 15 that provides operating system functionality for system 10. The modules further include a web application performance testing module 16 for performance testing a web application, including a web portal, and generating corresponding reports, and all other functionality disclosed herein. Module 16 can be formed of multiple modules, including a Java Agent for performing testing, and an analyzing module for analyzing testing results. System 10 can be part of a larger system, such as added functionality to the "WebCenter Portal" from Oracle Corp. Therefore, system 10 can include one or more additional functional modules 18 to include the additional functionality. A database 17 is coupled to bus 12 to provide centralized storage for modules 16 and 18.

As discussed, embodiments perform performance and diagnostic testing of Java-based web applications, including a web portal web application that includes multiple layers, such as shown in FIG. 1. In general, embodiments will include a server side component that resides on application server 110, and that interacts with a client side component that resides with web browser 101 on a client computer. Further, although one embodiment is a Java-based framework, embodiments can be implemented with a Java application that is not required to be running on an application server. In this embodiment, instead of using a web application, a command line tool (i.e., "tlCmd") is used to implement embodiments through a socket. When the application to be performance tested is started, the TCP/IP port to be listened to has to be declared.

Java-based web applications include multiple "methods". A method is a set of code which is referred to by name and can be called (invoked) at any point in a program simply by utilizing the method's name, similar to a subroutine. Each method has its own name. When that name is encountered in a program, the execution of the program branches to the body of that method. When the method is finished, execution returns to the area of the program code from which it was called, and the program continues on to the next line of code. A complex web application, such as a web portal, can contain thousands if not millions of methods.

In order to determine performance diagnostics for a Java-based web application, the performance of the methods need to be tested. Known Java-based performance measuring tools either perform lightweight sampling of a small subset of these methods, or perform a full instrumentation, in which every method is tested. The sampling provides incomplete information as the subset of methods is not strategically or intelligently selected, while the full instrumentation requires a large overhead and a relatively large amount of time to complete. In contrast, embodiments of the present invention allow a user with a configure tool to focus on only the key critical methods, thus providing much more relevant diagnostics as compared to the sampling techniques.

Figure 3:
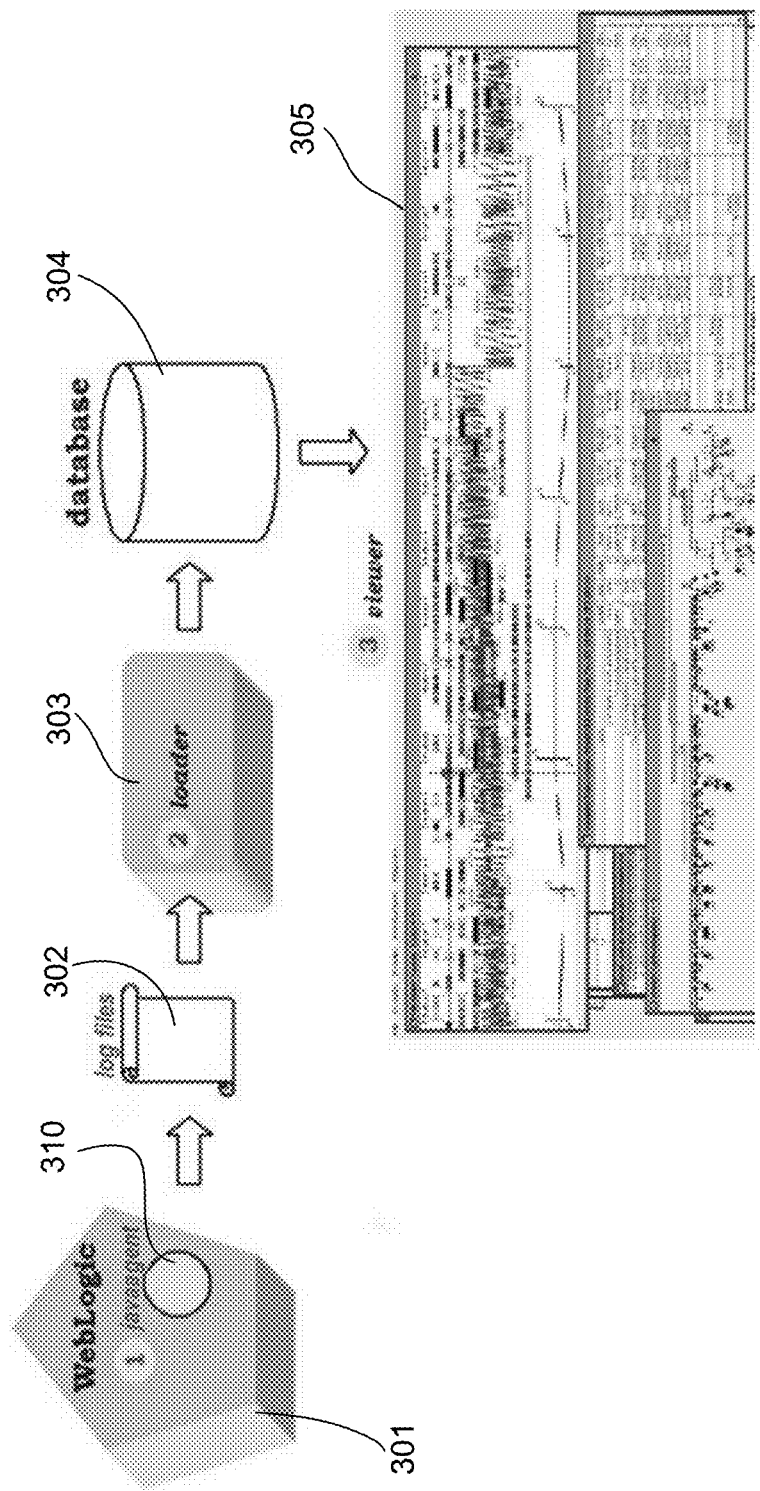
FIG. 3 is an overview diagram of components of a Java-based web application performance testing tool in accordance with embodiments of the present invention.

FIG. 3 is an overview diagram of components of a Java-based web application performance testing tool in accordance with embodiments of the present invention. At the web application server side 301, the diagnostic "tool" is implemented as a "Java Agent" 310. Java Agents are software components that provide instrumentation capabilities to an application. In the context of agents, instrumentation provides the capability of redefining the content of class that is loaded at run-time. Web application server 301 in one embodiment is a WebLogic server from Oracle Corp., which is a Java Platform Enterprise Edition ("Java EE") application server.

Java Agent 310 monitors a web application's execution and persists performance measurements. The data is generated in the form of log files 302, and sent to a loader 303, and then to a database 304. Log file 302 is a text file containing a sequence of the log of the requests. In one embodiment, the syntax of such log files 302 is defined using the following EBNF (Extended Backus Naur Form) grammar:

```
log-file      ::= (request-log)*
request-log   ::= request-general-info
                  request-calltree
                  request-stack-traces
```

Loader 303 is then used to load log files 302 into database 304 so that the files can be visualized and be queried interactively. The files are then transformed into HTML format so they can be viewed by a viewer as performance data 305. Performance data 305, in general, is formed of text files with well-defined syntax, and can be viewed and analyzed on a web browser at a client computer.

In one embodiment, Java Agent 310 is set up by instrumenting dynamically the Java classes in accordance with embodiments of the present invention. As shown in the following pseudo-code, where the Java Agent is referred to as "trackerLite", the "-javaagent" option is added to the Java command that launches the web application that is the subject of performance testing and that launches the Weblogic application server:

```
java . . .
    -javaagent:\mylib\trackerLite.jar
    -DtrackerLite.home=D:\mytmp
    . . .
    weblogic.Server
```

Once the Java Agent is set up by adding the Java options, the Java Agent is deployed on the instrumented server (e.g., the WebLogic server). The web application will provide control of the Java Agent as described below.

Embodiments operate in a relatively non-intrusive manner rather than using a "brute force" method that blindly collects all data for every request of the web application. In one embodiment, no data is collected for requests that are executing relatively fast. Instead, data is collected for relatively long/slow executing requests, for which data is collected using instrumentation and/or sampling. An example of a long/slow executing request in one embodiment is a request that takes approximately more than 3 seconds to execute. An example of a long executing request in one embodiment is approximately more than 3 seconds long.

Instrumentation

Figure 4:
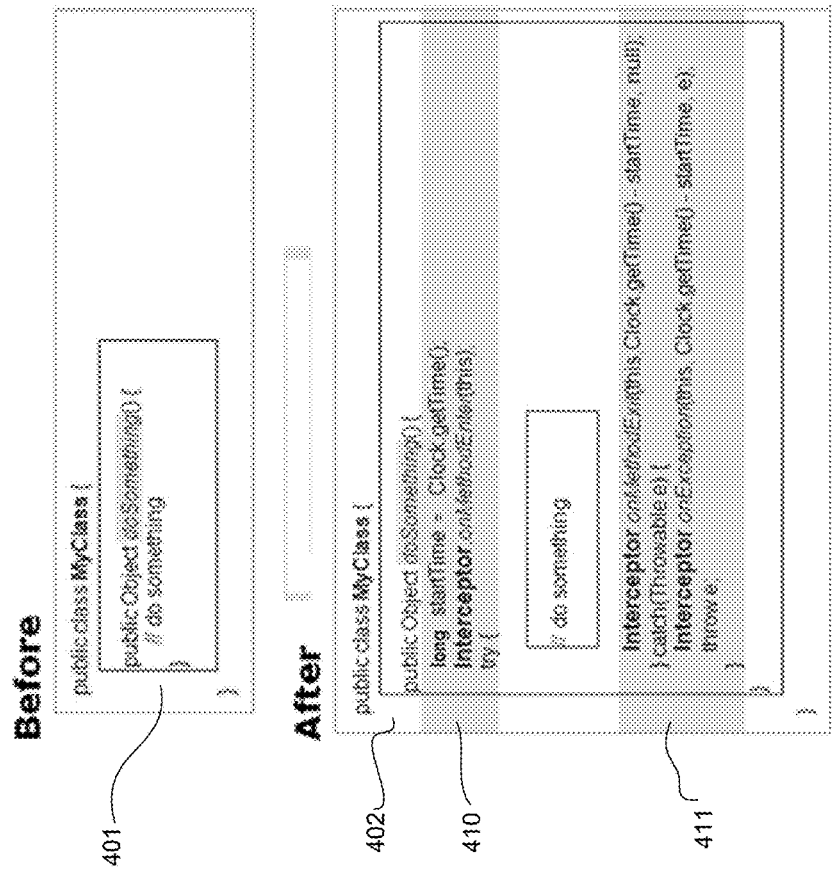
FIG. 4 illustrates a before and after viewing of diagnostic code after being injected into a Java method in accordance with embodiments of the present invention.

In one embodiment, a Java bytecode framework is used to inject the Java Agent specific code to methods. In one embodiment, the opensource "ASM" framework is used. ASM is an all-purpose Java bytecode manipulation and analysis framework. It can be used to modify existing classes or dynamically generate classes, directly in binary form. FIG. 4 illustrates a before and after viewing of diagnostic code after being injected into a Java method in accordance with embodiments of the present invention. The original method, before injection, is shown at 401. The method, now instrumented after injection, is shown at 402. The new injected instructions are shown in the shaded area at 410 and 411.

The injected code allows embodiments, on a per request basis, to gather performance statistics about methods, optionally gather arguments, return and "this" value of method invocation, collect any exception that occurs before re-throwing the exception to the caller, and reconstruct the call tree of the request.

One embodiment includes functionality for obtaining a "meaningful" call tree that is concise, so a user can easily and quickly glean relevant information, or the information can be automatically gleaned. A meaningful call tree should provide an explanation as to why it took too much time to execute the request, and should clearly easily pinpoint the component to blame for the delay. Therefore, in one embodiment, only "hot" methods are shown. A hot method is a method that takes what is considered a long time to execute.

In order to identify hot methods, embodiments first enter a discovering phase in which a very small number of methods is initially instrumented; one for each entering transport as follows:

http:weblogic.servletinternal.WebAppServletContext.execute(ServletRequestImpl,Servlet ResponseImpl)
    rmi: weblogic.rmi.internal.BasicServerRef.invoke(RuntimeMethodDescriptor,InboundRequest, Outbound Response)

The above two methods that are initially instrumented in one embodiment correspond to the servlet and the Enterprise JavaBeans ("EJB") entry points for a WebLogic application server. They constitute the initial list of methods to be instrumented. Embodiments also support web service using HTTP transport. A web service request at the application server is an HTTP request, so it is treated by a servlet. The servlet in one embodiment is a framework servlet (e.g., axis, jax-ws, etc.). The request will then pass through the gate of a servlet container entry point.

The discovering phase in one embodiment is an iterative process, where the user identifies hot methods and then adds these methods to a list using a .war web application. The hot methods can be dynamically added to the list without restarting the jvm. The class containing the newly discovered method, even if it is already loaded by the jvm, will be redefined (i.e., instrumented again). In another embodiment, all modifications are persisted/remembered and the new configuration is written in a local .cfg file. When a jvm is started, embodiments will first check if such a .cfg file exist locally and if so will load it. If such a file does not exist locally, then embodiments will load the one delivered in a .jar file, which is the default file.

Embodiments then immediately instrument these newly declared methods. Once the obtained call trees are considered meaningful, the discovering is complete. In one embodiment, to achieve a "least intrusive" testing, the number of instrumented methods needs to be reduced from the entirety of the available methods.

On entering instrumented methods, a time is taken and the request is chained to the active request list (this is done by the injected code). On leaving instrumented methods, the request is removed from the active request list, and if the request execution time observed is considered long, then all the information (call tree, stack traces) collected for the request is written to a disk. The task of writing the information is done asynchronously in one embodiment in order not to penalize the original method.

Sampling

In another embodiment, sampling is used to identify the hot methods. Embodiments include a polling thread that wakes up periodically (e.g., every 50 milliseconds, or request.pollPeriod=50 ms) to check the requests in the active request lists. For requests having a duration that has exceeded a predefined time (e.g., exceeding 500 milliseconds, or request.stucktime=500 ms), then embodiments collect their stack traces. These stack traces are kept on the Java heap. At the end of the request, if it is observed at that moment that the execution time exceeds a pre-defined time (e.g., 3 seconds, or any configurable value, with a different value able to be assigned for a particular URL) then all the stack traces are written to disk. At the end of the request, all information gathered for this request is released, freeing memory from the Java heap.

The collected stack traces are used to pinpoint slow classes and methods, and such methods are the methods that are instrumented in one embodiment. Repeated stack traces collected during execution of a request provide relevant information to determine the appropriate methods to instrument.

Figure 5:
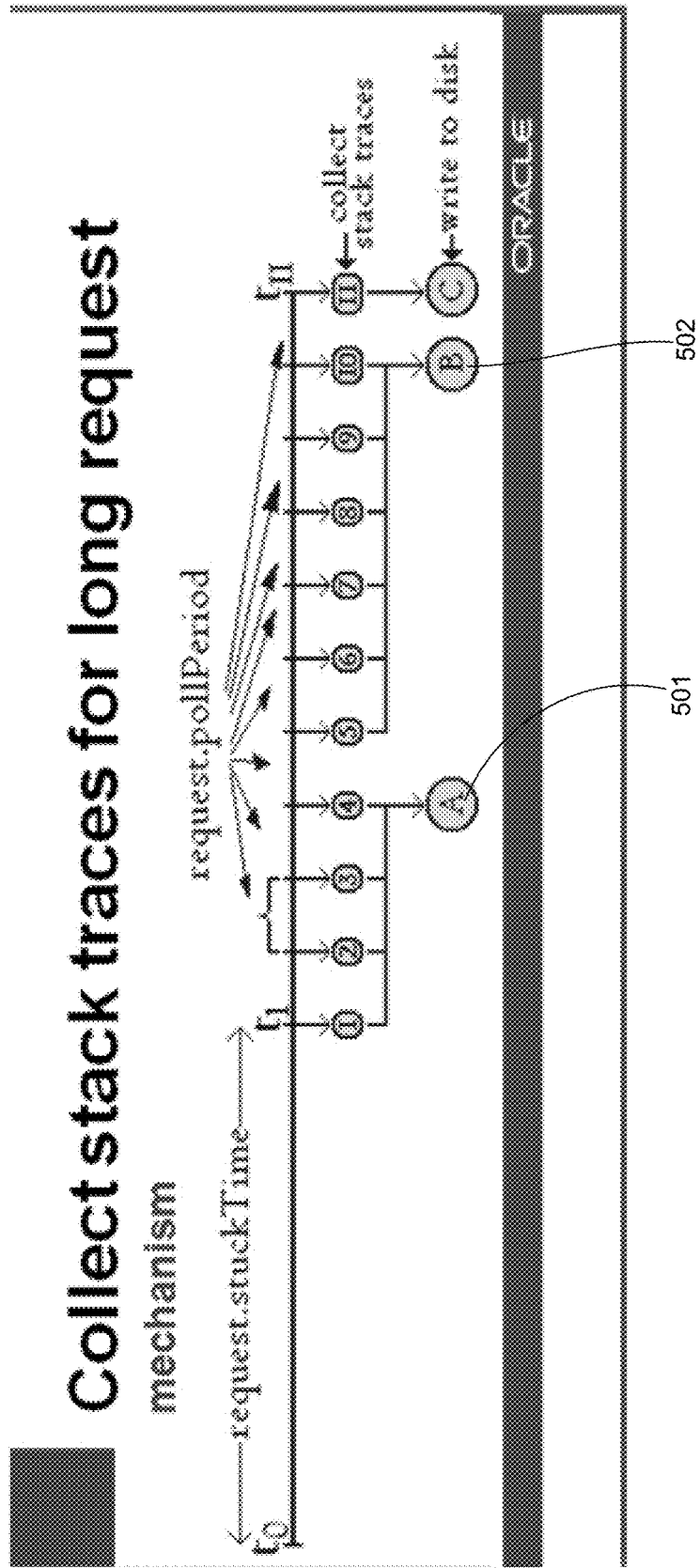
FIG. 5 illustrates a collection of stack traces that correspond to long requests in accordance to one embodiment.

In one embodiment, to reduce the memory footprint, repeated stack traces are only stored once. FIG. 5 illustrates a collection of stack traces that correspond to long requests in accordance to one embodiment. As shown in FIG. 5, at time $t_0$, an HTTP request arrives on the application server. For purposes of the example of FIG. 5, the request can be named "theRequest." It will be handled by an execute method (referred to as "theThread"), and the following method will be executed:

weblogic.servletinternal.WebAppServletContext.execute (ServletRequestImpl,ServletResponseImpl)

The above method is a well-known entry point of any HTTP request in WebLogic. On entry of this method, embodiments note the current time (i.e., time $t_0$).

During all the execution of this request, there is another thread that periodically (e.g., every 50 ms) wakes up and inspects all the active requests to see how long they are executing. For those requests that are still executing for more than the configurable parameter "request.stuckTime" (e.g., 500 ms), embodiments will get a stack trace for the thread working for the request.

Referring to "theRequest" example, starting at $t_1$ ($t_0$+500 ms), a stack trace is collected every 50 ms, which is the configurable parameter "request.pollPeriod". In the example of FIG. 5, 11 stack traces has been collected, at $t_0$+500 ms, $t_0$+550 ms, $t_0$+600 ms, $t_0$+650 ms, $t_0$+700 ms, $t_0$+750 ms, $t_0$+800 ms, $t_0$+850 ms, $t_0$+900 ms, $t_0$+950 ms and $t_0$+1 s.

There is only 11 stack traces collected for theRequest, because in this example it takes only a slightly more than 1 second for WebAppServletContext.execute to execute (e.g., approximately 1010 ms).

In the example, the collection of stack traces does not start at the moment of the request entered, but 500 ms later. Because in one embodiment there is no I/O disk, the collected stack trace are stored on the Java heap. The collection of stack trace ID is done by a thread (a polling thread) that is different from the thread that is executing the HTTP. The decision to save or to not save the collected stack trace on disk is done on leaving the method WebAppServletContext.execute. The decision to save such information is based on how much time the execution time take and if it exceeds a threshold value. All information relative to the request is then freed up from the Java heap As shown in FIG. 5, assume the first four stack traces collected are the same (e.g., generated from a thread waiting for the remote LDAP server, a thread hanging on the socket read instruction, etc.). Instead of keeping the four identical stack traces in the Java heap java, embodiments will only keep one copy of the stack trace, as shown at 501, with annotation regarding the first time ($t_0$+500 ms) and the last time ($t_0$+650 ms) the stack trace has been seen. Further, assume the 6 following collected stack traces are also the same (e.g., they are showing that the thread is waiting for the database server to respond to an SQL query). Embodiments will only keep one copy at 502 of the stack trace in the Java heap with annotation regarding the first time ($t_0+700$ ms) and the last time ($t_0+950$ ms) the stack trace has been seen. Therefore, the memory footprint is drastically reduced.

In order to further reduce the memory footprint, embodiments implement "stop methods" where two stack traces are considered identical when the stack trace elements of both stack traces are the same up to the stack trace element containing the stop methods. Below are some examples of stop methods:

oracle.toplink.publicinterface.UnitOfWork.
writeChanges( . . . )
oracle.toplink.publicinterface.Session.execute-
Query( . . . )

As an example of the output generated by embodiments of the present invention, assume that the web application is a healthcare application. A physician, after filling out a fillable form, submits an HTTP request to the application running on a remote application server. On the remote application server, the request is handled by a thread worker. Once the request is executed, the response is returned to the user in the form of a .pdf file.

Figure 6:
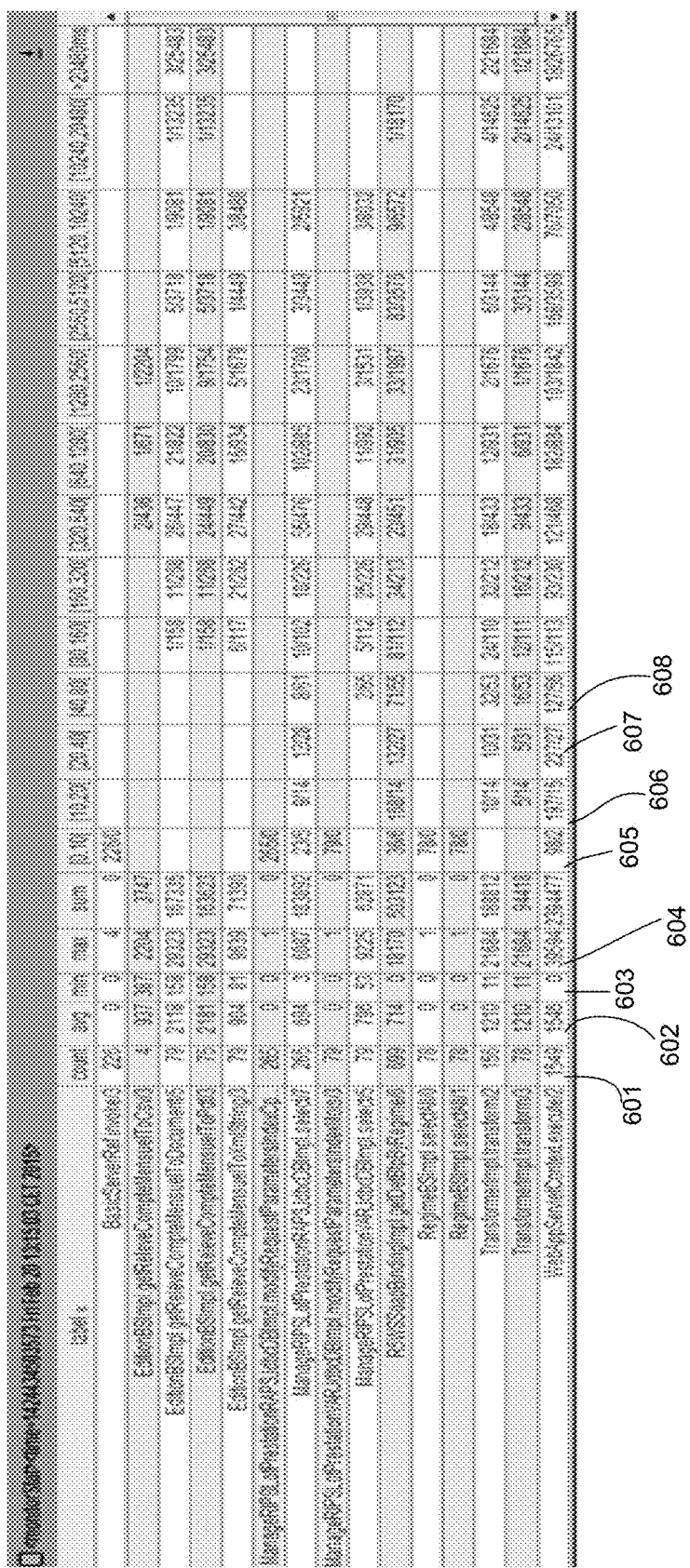
FIG. 6 illustrates a table that is generated by embodiments of the invention that provide statistics about method invocation time.

FIG. 6 illustrates a table that is generated by embodiments of the invention that provide statistics about method invocation time. Only methods that are declared for instrumentation as tested and shown. The statistics are applied globally to all requests during the aggregation time interval.
For example the table indicates that:
the method "WebAppServletContext.execute" has been invoked 1549 times (see column 601);
the mean value of the invocation time of this method is 1546 ms (see column 602);
the minimal value of the invocation time of this method is 0 ms (see column 603);
the maximal value of the invocation time of this method is 39594 ms (see column 604);
of the 1549 invocations:
98 have been executed in less 10 ms (see column 605);
197 have been executed in approximately 15 ms (see column 606);
227 have been executed in approximately of 27 ms (see column 607);
127 have been executed in approximately of 56 ms (see column 608);
and so on.

Embodiments collect information on a per request basis, and select the requests based on predefined criteria, such as the time duration needed for a request to execute. For example, with the healthcare application example, assume a request includes a physician asking for the statement for an account over a one month period, and a .pdf document is expected as the response. Because the request takes nearly 30 seconds to execute, it exceeds the predefined criteria, so embodiments collect information. The collected information includes:

The time the request has been taken care of by the application;
How much time it took to execute such request;
Hypertext Transfer Protocol ("HTTP") headers of the requests;
a call tree;
executed Structured Query Language ("sqls"); and
stack traces collected during all of its execution.

Figure 7:
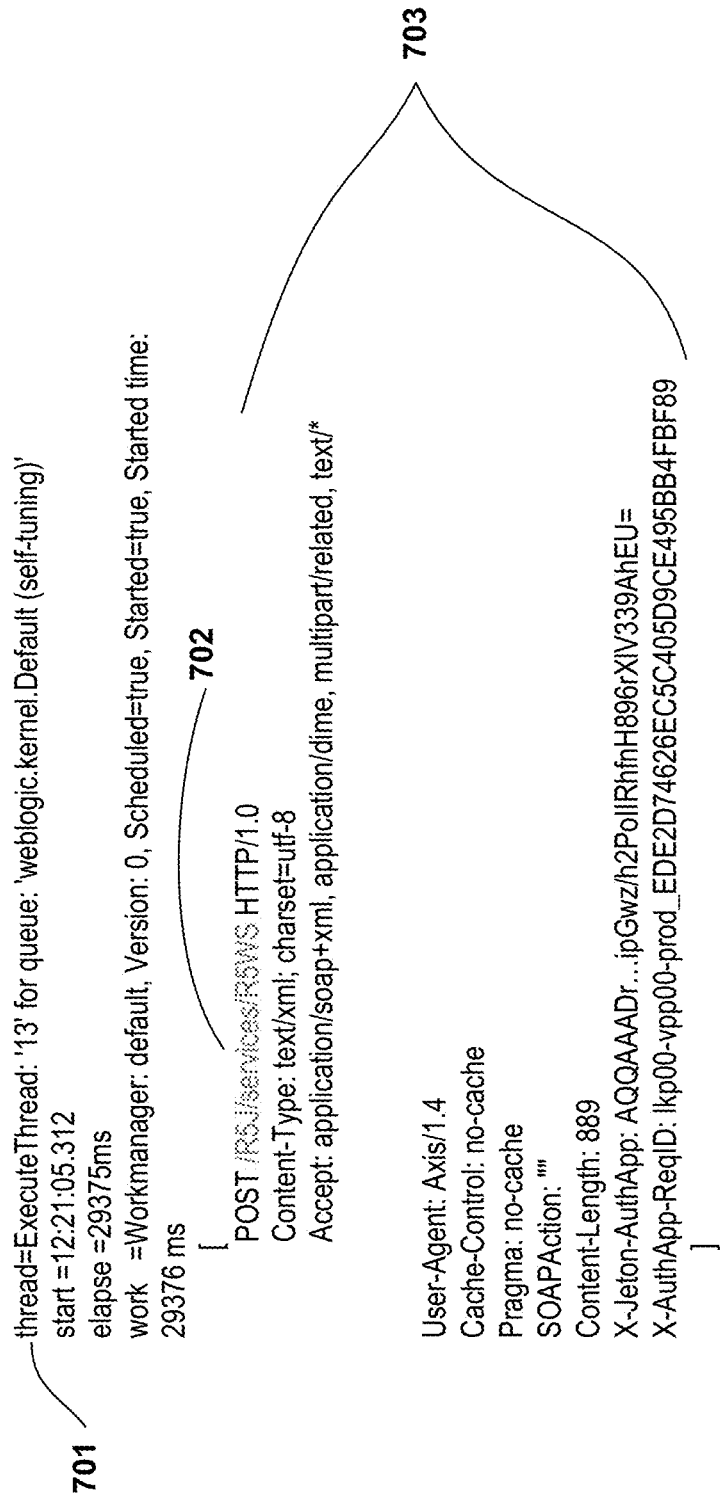
FIG. 7 illustrates a generated output in response to performance testing in accordance with an embodiment of the invention.

FIG. 7 illustrates a generated output in response to performance testing in accordance with an embodiment of the invention. As shown in FIG. 7, at 701 the elapsed time is shown, indicating that the request took nearly 30 seconds to execute. At 702, the uniform resource identifier ("URI"), which is a string of characters used to identify a name of a resource, is shown. At 703, the HTTP headers are shown.

Figure 8:
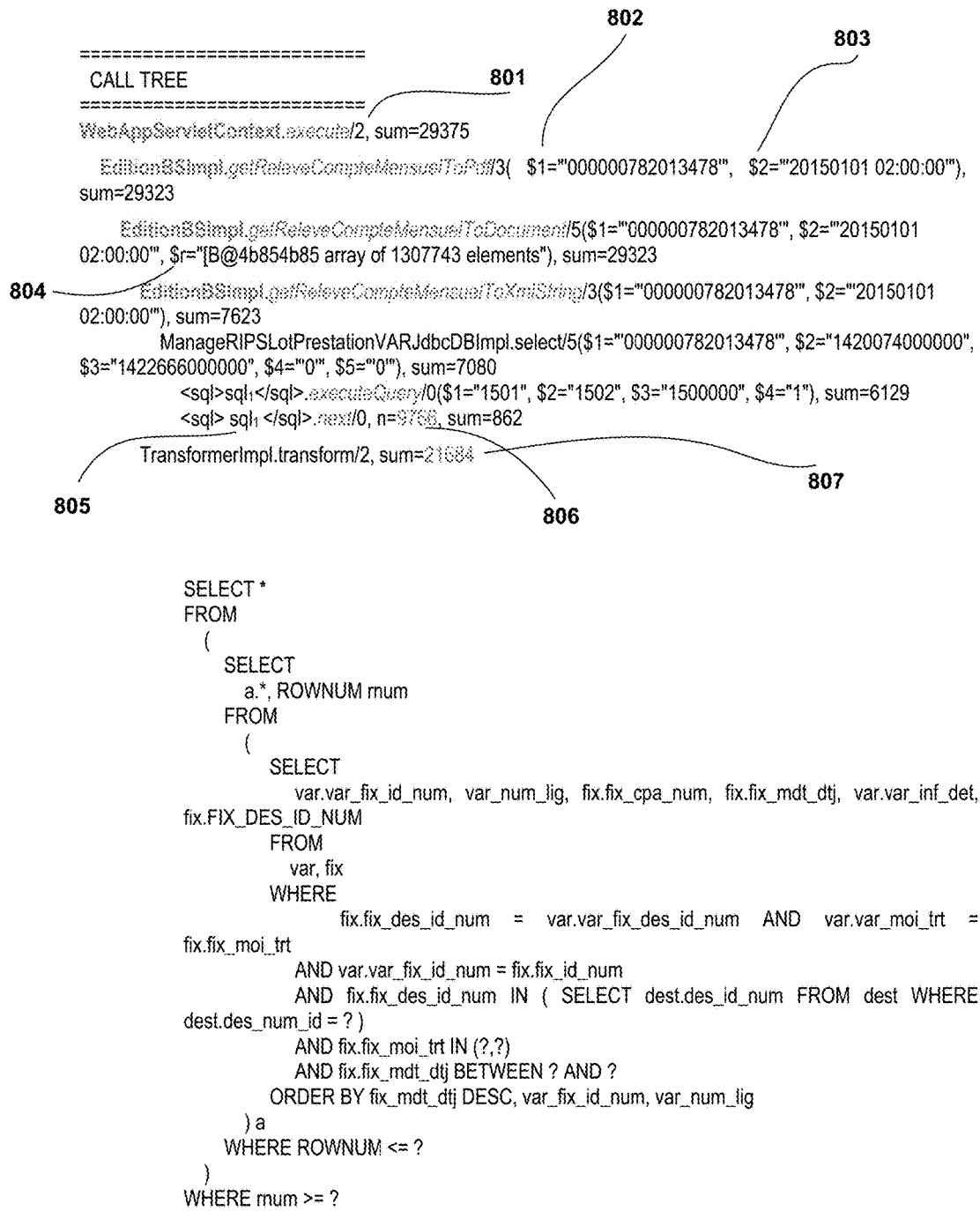
FIG. 8 illustrates a generated call tree output in response to performance testing in accordance with an embodiment of the invention.

FIG. 8 illustrates a generated call tree output in response to performance testing in accordance with an embodiment of the invention. As shown in FIG. 8, the call tree at 801 shows the entry point, for which "WebAppServletContext" is a common entry point for all HTTP requests. At 802, the first argument of the method is shown, which is the physician identifier. At 803, the second argument of the method is shown, which is the month. At 804, the size of the returned document is shown. At 805, the first sql ("$sql_1$") is shown. As shown at 806, the selection returned is 9755 tuples. At 807, it is shown that the Extensible Stylesheet Language Transformations ("XLST") transform (i.e., the conversion to a .pdf file) took more than 21 seconds, or the majority of the 30 total seconds to handle the request.

FIG. 9 illustrates a generated stack trace output in response to performance testing in accordance with an embodiment of the invention. As shown at 901, 200 stack traces are collected for the request. Only a portion of the first stack trace is shown on FIG. 9. As shown at 902, the first stack trace of the series of stack traces lasts more than 5 seconds.

Figure 10:
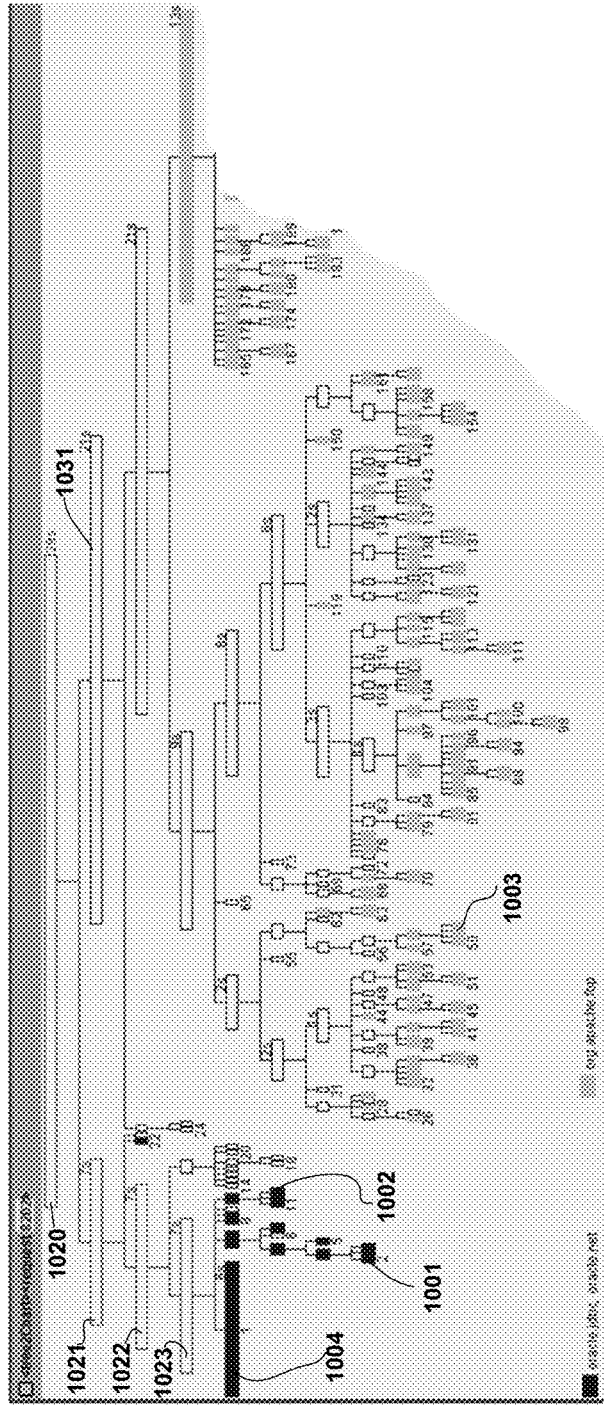
FIG. 10 illustrates a portion of a stack trace model output from performance testing in accordance with an embodiment of the invention.

Because of the large number of stack traces collected for a typical request, embodiments of the invention provide a summary of all stack traces using a graphical model. FIG. 10 illustrates a portion of a stack trace model output from performance testing in accordance with an embodiment of the invention. As shown in FIG. 10, each numbered leaf node (e.g., nodes at 1001, 1002, 1003, 1004) represents a stack trace. A full stack trace is formed by the path starting from the root node and ending at the leaf node. Each node gathers stack track elements, so the selection of node 1 (at 1004) generates the stack trace elements shown at 1010.

Each leaf of the tree of FIG. 10 represents a stack trace. All the leaf nodes are numbered starting from 1, and the number increments from left to right. The abscissa represents the time. The path starting from the root node and ending at the leaf node comprises the whole stack trace. Therefore, node 1 (1004) is composed of the nodes shown at 1020, 1021, 1022, 1023 and 1004. Each node of a tree represent a part of some call trace, so it is composed of consecutive stack trace elements.

Modeling computing activity of a thread as shown in FIG. 10, referred to as a sampling or call tree, is very helpful. A call tree is a visual representation of thread activity during a request execution. As shown in FIG. 10, the tree representing all stack traces is another visual representation of thread activity during request execution. Embodiments determine what methods to instrument to be able to get a meaningful call tree. The "hot" methods are among the ones floating at the boundary of the nodes in the tree of stack traces shown in FIG. 10.

For example, node 1020 has two child nodes 1021 and 1031. Node 1020 is the entry point of the request. The thread working for the request is determined to have been in this state during 29 seconds. The 29 seconds can be decomposed of 7 seconds in node 1021 and 21 seconds in node 1031. The decomposition can be explained by inspecting the stack trace elements in these three nodes. For node 1020, the last stack trace element can be inspected to locate the hot methods. For nodes 1021 and 1031, the first stack trace elements are inspected to locate the hot methods. Heuristics can be used for determining the hot methods from the stack trace.

Embodiments automatically recommend the hot methods from the stack trace based on the boundaries of the stack trace. For example, for the stack trace shown in FIG. 10, there are 4 boundaries: between nodes 1020 and 1021, between nodes 1021 and 1022, between nodes 1022 and 1023, and between nodes 1023 and 1004. In one embodiment, for each of these boundaries, the identified hot methods will be the last method of the leaving node and the first method of the entering node. For example, the last method of node 1020 and the first method of 1021 will be identified and recommended as hot methods.

Recommending the last method of the leaving node and the first method of the entering node provide good recommendations, particularly if such methods belong to the application's classes. However, alternative methods may be used if the last method of the leaving node, or the first method, are not in the application package. In this situation, one embodiment searches for another candidate in the node, choosing the nearest one that is the application's method.

Embodiments can automatically determine the boundaries of the stack trace in order to determine the hot methods. For example, assume the execution of the request includes:

authentication, and the LDAP access takes 500 ms;

calling a remote web service that takes 2 second to respond (2000 ms). For this request, embodiments will collect 2 stack traces:

a first stack trace showing that the execution thread is waiting for the remote LDAP server response. Embodiments will observe such a stack trace during the 500 ms;

a second stack trace showing that the execution thread is waiting for the remote web service response. Embodiments will observe such a stack trace during the 2 seconds.

A comparison of the different stack trace elements of both stack traces reveals that the top stack trace elements are the same. Stack trace elements are different at the bifurcation point where one branch is the authentication phase, and the other branch is the web service access point. This reflects the fact that the application calls successively the LDAP, and then the web service. It corresponds to the following call tree:

| application servlet |
|---|
| call LDAP |
| call web service |

Figure 11:
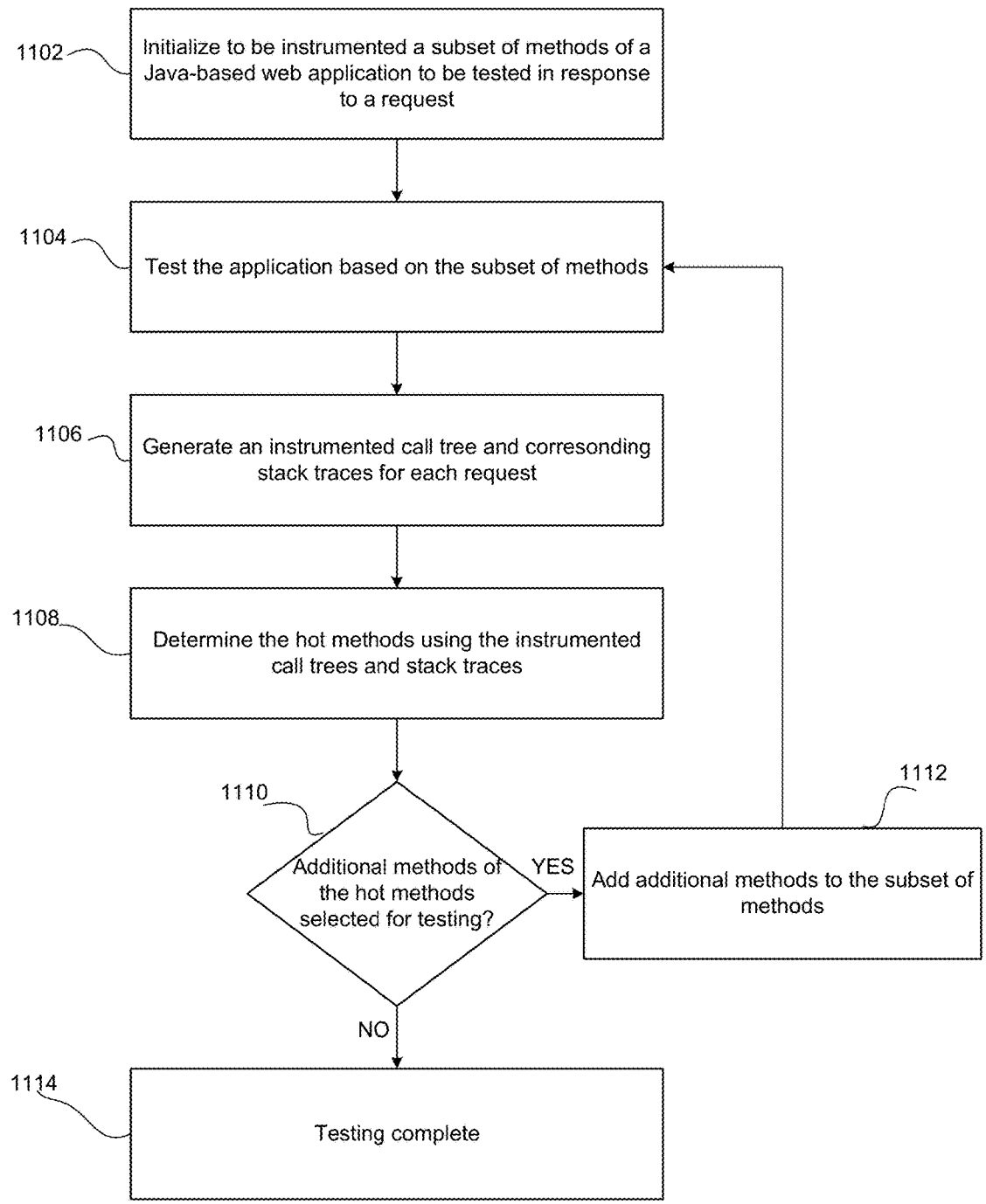
FIG. 11 is a flow diagram of the functionality of a web application performance testing module of FIG. 2 and other elements in accordance with one embodiment of the present invention.

FIG. 11 is a flow diagram of the functionality of web application performance testing module 16 of FIG. 2 and other elements in accordance with one embodiment of the present invention. In one embodiment, the functionality of the flow diagram of FIG. 11 is implemented by software stored in memory or other computer readable or tangible medium, and executed by a processor. In other embodiments, the functionality may be performed by hardware (e.g., through the use of an application-specific integrated circuit ("ASIC"), a programmable gate array ("PGA"), a field programmable gate array ("FPGA"), etc.), or any combination of hardware and software.

At 1102, a subset of methods of a Java-based web application to be tested in response to a request (e.g., an HTTP request) are initialized to be instrumented using a Java Agent (e.g., Java Agent 310 of FIG. 3). In one embodiment, the subset of methods correspond to each entering transport of the web application. For example, the methods can correspond to the servlet and the Enterprise JavaBeans ("EJB") entry points for a WebLogic application server.

At 1104, the application is tested on the subset of methods. The testing, for each request, can include instrumentation that outputs a "meaningful" or "instrumented" call tree, and sampling that outputs multiple stack traces.

At 1106, as a result of the testing, and when the request takes longer than a predetermined time to execute (e.g., greater than 2 seconds) the instrumented call tree is generated for each request. The testing will also generate stack traces from the sampling. The instrumented call tree, such as the instrumented call tree of FIG. 10, is a visual as well as a computer-readable representation (i.e., a Java object) of thread activity. The instrumented call tree in one embodiment only shows the instrumented methods (i.e., the subset of methods at 1104).

At 1108, using the instrumented call trees, and stack traces, "hot" methods are determined, which are methods that take longer than a predetermined time period to execute. In one embodiment, the hot methods are automatically determined by examining the boundaries of the stack traces.

At 1110, it is determined if any additional methods of the determined hot methods are selected for testing. In one embodiment, a user can determine additional hot methods for testing using the following information provided by embodiments of the invention:

the instrumented call tree (i.e., generated from only the instrumented methods);

stack traces;

a global tree (i.e., a view of all stack traces);

a computed call tree (i.e., generated from analyzing all of the stack traces from all of the methods).

The additional methods can be determined by receiving a selection by the user, or automatically using methods disclosed above.

If yes at 1110, at 1112, the additional methods are added to the subset of the methods at 1104, and the functionality continues at 1104.

If no at 1110, at 1114, the testing ends. The generated data is used to generate reports for further analysis.

In one embodiment, the following pseudo code functionality is used to automatically determine the boundaries between two stack traces:

[step 1] initialize the root of the tree to one node containing all stack trace elements of the first stack trace of the request

Figure 12A:
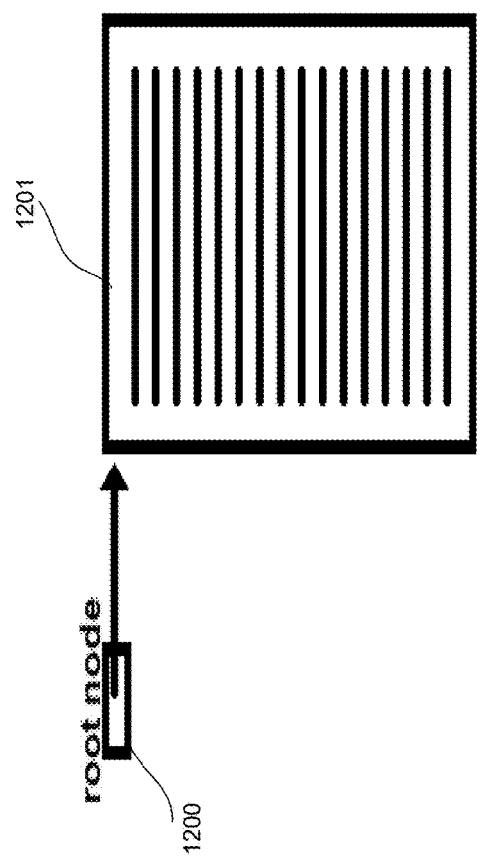

[step 2] loop on the remaining stack traces of the request compare the stack trace elements of the stack trace with the stack trace elements of the rightmost branch of the tree identify the point where there is difference break the last node into two branches the remaining stack trace elements of the stack trace will form a new node of the right branch FIGS. 12A, 12B, 13A and 13B illustrate the above functionality to automatically determine the boundaries between two stack traces in accordance with embodiments of the invention. At FIG. 12A, as a result of step 1, a single node (pointed by the variable "root node") 1200 is created. Node 1200 contains all the stack trace elements of the first stack trace at 1201. Each line in 1201 represents a stack trace element of the first stack trace. In fact, variable root node 1200 points to a tree of nodes, which in FIG. 12A is reduced to a single node. Progressively, as the following stack traces are aggregated the tree takes shape.

Figure 12B:
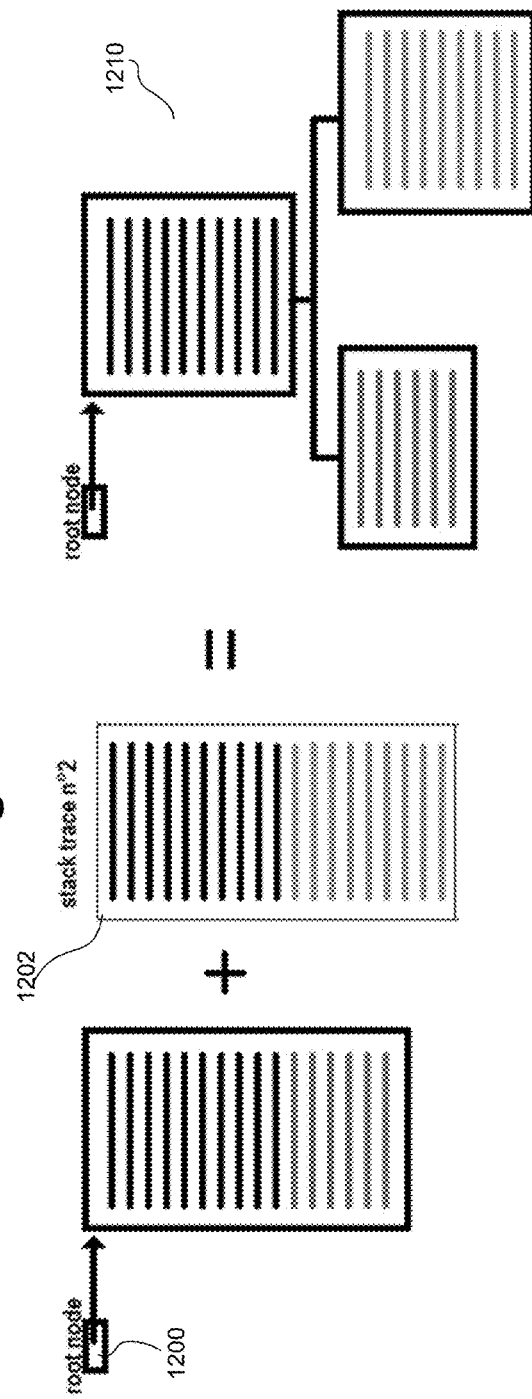

At FIG. 12B, the initial single node tree is reshaped as tree 1210 when the second stack trace 1202 is aggregated.

At FIG. 13A, a third stack trace 1301 is aggregated with tree 1210 to form tree 1310.

At FIG. 13B, a fourth stack trace 1312 is aggregated with tree 1310 to form tree 1320. The functionality continues with additional aggregation in a similar manner.

When the next stack trace is aggregated, the new stack trace is only compared with the previous stack trace. The latter is the most right path of the tree. In all instances, the number of the leaf node is equal to the number of stack traces aggregated in the call tree, and the tree grows from left to right.

Figure 14:
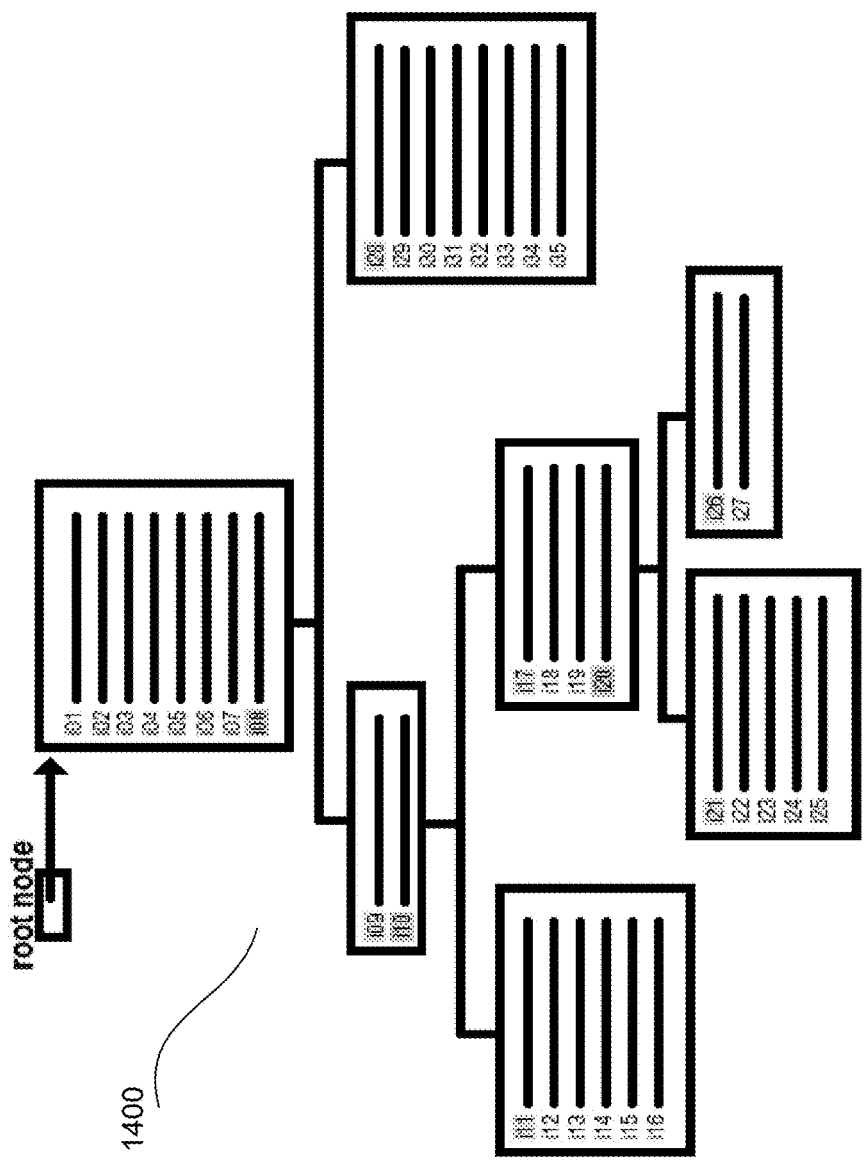
FIG. 14 illustrates an example of an aggregated call tree of all stack traces in accordance with one embodiment.
Figure 15A:
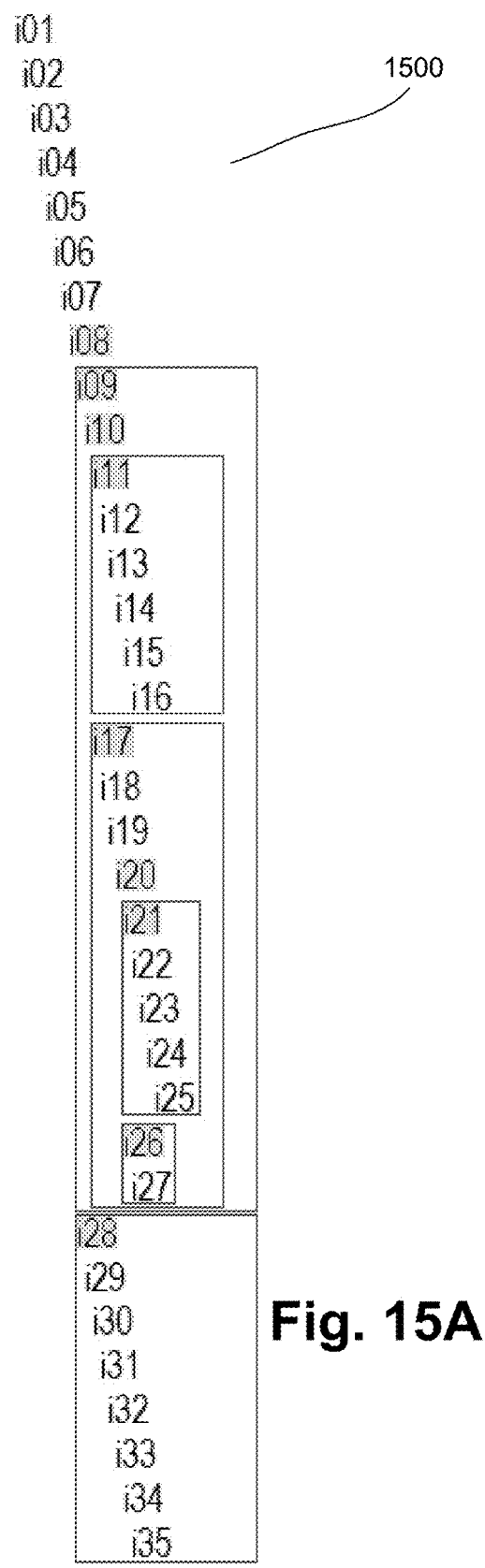
FIG. 15A illustrates a computed call tree generated from an aggregated call tree in accordance with embodiments of the present invention.
Figure 15B:
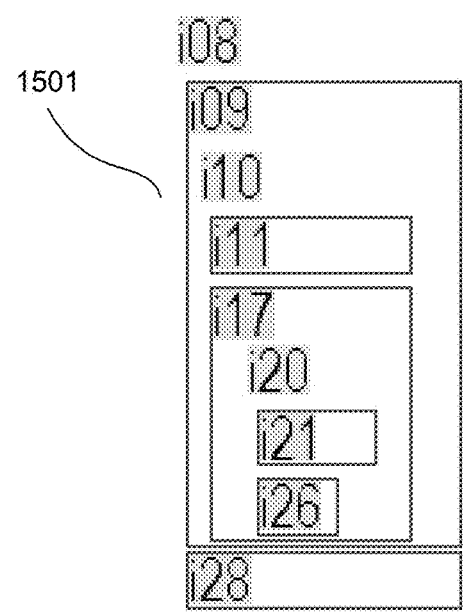
FIG. 15B illustrates a reduced computed call tree in accordance with embodiments of the present invention.

As disclosed above, the stack traces generated for a request can be represented by a call tree aggregating all stack traces of the request. FIG. 14 illustrates an example of an aggregated call tree 1400 of all stack traces in accordance with one embodiment. From aggregated tree 1400, a "computed" call tree can be generated. FIG. 15A illustrates a computed call tree 1500 generated from aggregated call tree 1400 in accordance with embodiments of the present invention. Embodiments then only retain methods on the boundaries of nodes in the tree, forming a reduced computed call tree 1501 as shown in FIG. 15B. The reduced computed call tree is approximately equivalent to a meaningful/instrumented call tree, so embodiments declare the methods in the boundary as the methods to be instrumented, in accordance with 1108 of FIG. 11.

In one embodiment, to further aid in the decision making at 1110, embodiments group different requests that generate a similar instrumented call tree. In one embodiment, known clustering methods and tree edit distance methods are used to perform the grouping.

As described, embodiments generate detailed reports as a result of diagnosing methods and the generated test data. In one embodiment, one report shows, for each HTTP request processed in the server side, a high level breakdown on each request. This provides a clear overview of many specific areas critical to the application, for example how many database calls and how much time is spent on a per request basis. From these numbers, it can be determined where to further drill down and optimize/improve the server side of performance.

Another report provides, within each request, how the program code processes the request in the form of an instrumented call tree such as the instrumented call tree of FIG. 10. An instrumented call tree provides the correct amount of information for the code execution logic. A user can drill down in the call tree to find out the root cause of a particular slow method, and how many calls and how much is time spent for the method. A user can configure embodiments to dump a calling stack for each method invocation such that a developer can evaluate whether those calls are necessary and expected.

Embodiments can provide a per request statistics table for each call tree, which is a breakdown based on code execution logic, but certain methods may be called from multiple code paths. Therefore, embodiments provide for a particular interested method, how many times it is called and how much time is spent in total for that method.

Embodiments can track down every database call with great detail, such as what sql statement it executes, how many times, the minimum, maximum, mean, standard deviation, and total time for each sql execution, and provide a report. Embodiments can be configured to dump a calling stack for each sql call.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to performance test a web application, the performance testing comprising:
   initializing to be instrumented a subset of Java methods of the web application to be tested in response to a web page request;
   testing the application based on the subset of Java methods, wherein the testing comprises instrumentation;
   generating an instrumented call tree and corresponding stack traces for each web page request that has a duration that exceeds a predefined time in response to the testing, wherein the stack traces are stored in a Java heap;
   automatically determining boundaries between the generated stack traces to determine one or more of the subset of Java methods that take longer than a predetermined time period to execute using the instrumented call trees and the stack traces;
   determining, based on the one or more of the subset of Java methods that take longer than the predetermined time period to execute, additional Java methods to be tested, the additional Java methods to be tested determined from the boundaries between the stack traces;
   adding the additional Java methods that take longer than the predetermined time period to execute to the subset of Java methods and repeating the testing, including testing the additional Java methods; and
   wherein the automatically determining boundaries between stack traces generated for each web page request that has the duration that exceeds the predefined time comprises forming trees of stack traces, each stack trace comprising a tree having a root node and a plurality of leaf nodes, and for each boundary of a stack trace tree determining a last method of a leaving node and a first method of an entering node.

2. The computer readable medium of claim 1, the automatically determining boundaries between two stack traces comprises:
   initializing a root of a first tree to one node containing all stack trace elements of a first stack trace of the request;
   looping on the remaining stack traces of the request comprising:
      comparing the stack trace elements of the stack trace with the stack trace elements of the rightmost branch of the tree;
      identifying a point where there is a difference;
      breaking the last node into two branches; and
      forming a new node of the rightmost branch of the tree from the remaining stack trace elements of the stack trace.

3. The computer readable medium of claim 1, further comprising determining duplicate stack traces and only keeping one copy of the duplicate stack traces in the Java heap.

4. The computer readable medium of claim 1, further comprising using stop methods to store only one copy of a plurality of repeated stack traces, wherein the web page request is a Hypertext Transfer Protocol (HTTP) request.

5. The computer readable medium of claim 2, wherein the testing comprises deploying a Java agent on an instrumented server.

6. The computer readable medium of claim 1, wherein the adding the additional Java methods comprises using a .war web application without restarting a corresponding Java virtual machine.

7. The computer readable medium of claim 5, wherein the instrumented server is a WebLogic server and wherein the initializing the subset of Java methods comprises using a servlet and Enterprise JavaBeans entry points of the WebLogic server as the subset of Java methods.

8. A method for performance testing a web application, the method comprising:
   initializing to be instrumented a subset of Java methods of the web application to be tested in response to a web page request;
   testing the application based on the subset of Java methods, wherein the testing comprises instrumentation;
   generating an instrumented call tree and corresponding stack traces for each web page request that has a duration that exceeds a predefined time in response to the testing, wherein the stack traces are stored in a Java heap;
   automatically determining boundaries between the generated stack traces to determine one or more of the subset of Java methods that take longer than a predetermined time period to execute using the instrumented call trees and the stack traces;
   determining, based on the one or more of the subset of Java methods that take longer than the predetermined time period to execute, additional Java methods to be tested, the additional Java methods to be tested determined from the boundaries between the stack traces;
   adding the additional Java methods that take longer than the predetermined time period to execute to the subset of Java methods and repeating the testing, including testing the additional Java methods; and
   wherein the automatically determining boundaries between stack traces generated for each web page request that has the duration that exceeds the predefined time comprises forming trees of stack traces, each stack trace comprising a tree having a root node and a plurality of leaf nodes, and for each boundary of a stack trace tree determining a last method of a leaving node and a first method of an entering node.

9. The method of claim 8, the automatically determining boundaries between two stack traces comprises:
   initializing a root of a first tree to one node containing all stack trace elements of a first stack trace of the request;
   looping on the remaining stack traces of the request comprising:
      comparing the stack trace elements of the stack trace with the stack trace elements of the rightmost branch of the tree;
      identifying a point where there is a difference;
      breaking the last node into two branches; and
      forming a new node of the rightmost branch of the tree from the remaining stack trace elements of the stack trace.

10. The method of claim 8, further comprising determining duplicate stack traces and only keeping one copy of the duplicate stack traces in the Java heap.

11. The method of claim 8, further comprising using stop methods to store only one copy of a plurality of repeated stack traces, wherein the web page request is a Hypertext Transfer Protocol (HTTP) request.

12. The method of claim 9, wherein the testing comprises deploying a Java agent on an instrumented server.

13. The method of claim 8, wherein the adding the additional Java methods comprises using a .war web application without restarting a corresponding Java virtual machine.

14. The method of claim 12, wherein the instrumented server is a WebLogic server and wherein the initializing the subset of Java methods comprises using a servlet and Enterprise JavaBeans entry points of the WebLogic server as the subset of Java methods.

15. A system for performance testing a web application, the system comprising:
   an analyzing module configured to initialize to be instrumented a subset of Java methods of the web application to be tested in response to a web page request;
   a Java agent configured to test the application based on the subset of Java methods, wherein the test comprises instrumentation;
   the analyzing module further configured to:
      generate an instrumented call tree and corresponding stack traces for each web page request that has a duration that exceeds a predefined time in response to the testing, wherein the stack traces are stored in a Java heap;
      automatically determine boundaries between the generated stack traces to determine one or more of the subset of Java methods that take longer than a predetermined time period to execute using the instrumented call trees and the stack traces;
      determine, based on the one or more of the subset of Java methods that take longer than the predetermined time period to execute, additional Java methods to be tested, the additional Java methods to be tested determined from the boundaries between the stack traces;
   add the additional Java methods that take longer than the predetermined time period to execute to the subset of Java methods and repeat the testing using the Java agent, including testing the additional Java methods; and
   wherein the automatically determining boundaries between stack traces generated for each web page request that has the duration that exceeds the predefined time comprises forming trees of stack traces, each stack trace comprising a tree having a root node and a plurality of leaf nodes, and for each boundary of a stack trace tree determining a last method of a leaving node and a first method of an entering node.

16. The system of claim 15, the automatically determining boundaries between two stack traces comprises:
   initializing a root of a first tree to one node containing all stack trace elements of a first stack trace of the web page request;
   looping on the remaining stack traces of the web page request comprising:
      comparing the stack trace elements of the stack trace with the stack trace elements of the rightmost branch of the tree;
      identifying a point where there is a difference;
      breaking the last node into two branches; and
      forming a new node of the rightmost branch of the tree from the remaining stack trace elements of the stack trace.

17. The system of claim 15, the analyzing module further configured to use stop methods to store only one copy of a plurality of repeated stack traces.

18. The system of claim 15, further comprising an instrumented server that deploys the Java agent, wherein the web page request is a Hypertext Transfer Protocol (HTTP) request.

19. The system of claim 15, wherein the adding the additional Java methods comprises using a war web application without restarting a corresponding Java virtual machine.

20. The system of claim 18, wherein the instrumented server is a WebLogic server and wherein the initialize the subset of Java methods comprises using a servlet and Enterprise JavaBeans entry points of the WebLogic server as the subset of Java methods.

\* \* \* \* \*